United States Patent
Keren et al.

(10) Patent No.: US 11,374,982 B1
(45) Date of Patent: Jun. 28, 2022

(54) STATIC ANALYSIS TECHNIQUES FOR DETERMINING REACHABILITY PROPERTIES OF NETWORK AND COMPUTING OBJECTS

(71) Applicant: Wiz, Inc., Palo Alto, CA (US)

(72) Inventors: Shai Keren, Ramat Gan (IL); Daniel Hershko Shemesh, Givat Shmuel (IL)

(73) Assignee: Wiz, Inc., Palo Alto, CA (US)

( * ) Notice: Subject to any disclaimer, the term of this patent is extended or adjusted under 35 U.S.C. 154(b) by 0 days.

(21) Appl. No.: 17/179,135

(22) Filed: Feb. 18, 2021

Related U.S. Application Data

(63) Continuation-in-part of application No. 17/109,883, filed on Dec. 2, 2020.

(51) Int. Cl.
  *G06F 15/173* (2006.01)
  *H04L 9/40* (2022.01)
  *G06F 16/901* (2019.01)
  *G06F 16/903* (2019.01)

(52) U.S. Cl.
  CPC ............ *H04L 63/20* (2013.01); *G06F 16/903* (2019.01); *G06F 16/9024* (2019.01); *H04L 63/101* (2013.01); *H04L 63/1425* (2013.01)

(58) Field of Classification Search
  CPC ... H04L 63/20; H04L 63/101; H04L 63/1425; G06F 16/903; G06F 16/9024
  USPC ....... 709/201, 204, 205, 217, 218, 219, 223, 709/224
  See application file for complete search history.

(56) References Cited

U.S. PATENT DOCUMENTS

| | | | |
|---|---|---|---|
| 7,392,539 B2* | 6/2008 | Brooks | H04L 63/0263 709/223 |
| 10,171,300 B2* | 1/2019 | Eggen | H04L 41/0896 |
| 10,924,347 B1* | 2/2021 | Narsian | H04L 41/0853 |
| 2004/0019803 A1 | 1/2004 | Jahn | |
| 2014/0157417 A1* | 6/2014 | Grubel | H04L 63/1433 726/25 |
| 2016/0044057 A1 | 2/2016 | Chenette et al. | |
| 2016/0048556 A1* | 2/2016 | Kelly | G06Q 30/02 707/767 |
| 2016/0359872 A1* | 12/2016 | Yadav | H04L 63/1425 |
| 2016/0373944 A1* | 12/2016 | Jain | H04W 24/02 |
| 2017/0075981 A1* | 3/2017 | Carlsson | G06F 16/285 |
| 2018/0024981 A1* | 1/2018 | Xia | G06F 40/18 715/215 |
| 2019/0095530 A1* | 3/2019 | Booker | G06F 16/313 |
| 2020/0267175 A1 | 8/2020 | Atighetchi et al. | |

(Continued)

*Primary Examiner* — Liang Che A Wang
(74) *Attorney, Agent, or Firm* — M&B IP Analysts, LLC

(57) ABSTRACT

A method and system for determining reachability properties of security objects are provided. The method includes accessing a security graph, wherein the security graph lists all security objects and their connections in a cloud environment of an organization; identifying a plurality of network paths in the cloud environment, wherein each network path includes at least two security objects accessible in the cloud environment; for each of the plurality of identified network paths, iteratively analyzing each security object in a respective network path to determine its reachability properties, wherein the reachability properties of a security object as a minimal set of reachable properties of all other security objects in the respective network path; and populating the security graph with the determined reachability properties of each security object.

19 Claims, 9 Drawing Sheets

(56) References Cited

U.S. PATENT DOCUMENTS

2020/0322227 A1* 10/2020 Janakiraman ......... H04L 43/045
2020/0374343 A1* 11/2020 Novotny ................. G06F 17/12
2020/0382539 A1* 12/2020 Janakiraman ....... H04L 63/0428

* cited by examiner

STATIC ANALYSIS TECHNIQUES FOR DETERMINING REACHABILITY PROPERTIES OF NETWORK AND COMPUTING OBJECTS

CROSS-REFERENCE TO RELATED APPLICATIONS

This application is a continuation-in-part application of U.S. patent application Ser. No. 17/109,883, filed Dec. 2, 2020, the contents of which are hereby incorporated by reference.

TECHNICAL FIELD

The present disclosure relates generally to network administration, in particular, to systems and methods for automated generation of network analysis insights.

BACKGROUND

As businesses, governments, and other organizations expand and increase their digital presence through various computer, network, and web technologies, the same parties may be increasingly vulnerable to developing cyber-threats. While updated solutions provide for management of prior cyber-threats, the same systems may include new vulnerabilities, which attackers may seek to identify and exploit to gain access to sensitive systems and data, Specifically, as organizations transition into multi-level computing systems, implementing computing solutions at the individual, group, team, and cloud levels, these systems, and the links between the elements of the layers, as well as the links between elements of different layers, include vulnerabilities which prior solutions fail to address.

Due to the distributed nature of large, multi-layered network systems, management of network access and use may be difficult or impossible for lone administrators or teams of administrators. Management of such code-to-cloud systems, and protection of the same, may require monitoring of large numbers of devices, systems, and components. Further, as each device, system, or component of a network system may be variously connected with the other elements of the system, including connections with multiple other devices via multiple protocols, management and monitoring of individual devices and connections may be untenable.

To address the need to manage large, distributed network systems, operators and administrators may employ various solutions to provide for network analysis. Certain network analysis solutions include manual review of devices, connections, and networks, providing for thorough, specific analysis of individual elements of a network. However, such manual solutions may require prohibitive outlays of time and effort to successfully review every component and connection of a large, multi-layer network, thus failing to provide a solution for analysis of modern network systems. In addition, various analysis solutions include solutions directed to the monitoring of specific device types, such as, for example, firewall control systems, which may provide for management of all firewalls installed in a given network. Similarly, protocol-specific analysis solutions may provide for monitoring of all traffic occurring over given protocols, within the network. However, such specialized solutions may fail to provide for streamlined monitoring and management of all components and connections of a network, where the network includes multiple types of devices communicating via multiple protocols. Further, protocol-agnostic solutions may provide for overall traffic management, providing monitoring and management solutions for all traffic arising within a network. However, such protocol-agnostic solutions may be over-broad, providing irrelevant or redundant information, and may require specification of connections to monitor, reducing efficacy in network-management contexts, while failing to provide device-specific insights, thereby failing to provide for integrated device and connection analysis within a complex, multi-layer network.

In addition, certain solutions providing for the management of large, distributed network systems may fail to provide for agentless management, non-logging solutions, and the like. Agentless management, whereby such large, distributed network systems are managed without the use of a dedicated management agent system or device, may provide for reduced maintenance requirements, as a management agent may require operation and maintenance in addition to the efforts required by the remainder of the network. In addition to failing to provide for agentless management, various solutions for the management of large, distributed network systems fail to provide for non-logging management of the same. Non-logging management, where network analyses and other management processes are executed without reference to netflow logs, provides for reductions in management computing requirements and resource dependency when compared with logging solutions, which may require, without limitation, the execution of additional processing steps or tasks to analyze or process netflow logs, the dependency of the management solution or process on various netflow log resources or repositories, and the like. In addition to the shortcomings described above, current solutions for management of large, distributed network systems may fail to provide for agentless, non-logging management.

Further, certain current solutions, as described hereinabove, fail to provide for the need to collect security object properties, and insights relevant thereto. As the systems described hereinabove, such as large networks implemented for a business or other organization, may include large numbers of devices, devices with complex configuration or management constraints current network analysis solutions may fail to provide granular, comprehensible representations of network information. Although current solutions may provide for the inspection of various security objects, thereby providing an understanding of the properties of individual inspected elements, such solutions fail to provide network information which describes the role of an individual entity within such a network or a cloud environment, as well as the vulnerabilities presented by the entities' placements within the network configuration. As a result, network administrators, and the like, may seek a solution which allows for network analysis and includes granular, comprehensive representation of security object properties and insights.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for determining reachability properties of security objects. The method comprises accessing a security graph, wherein the security graph lists all security objects and their connections in a cloud environment of an organization; identifying a plurality of network paths in the cloud environment, wherein each network path includes at least two security objects accessible in the cloud environment; for each of the plurality of identified network paths, iteratively analyzing each security object in a respective network path to determine its reachability properties, wherein the reachability properties of a security object as a minimal set of reachable properties of all other security objects in the respective network path; and populating the security graph with the determined reachability properties of each security object.

In addition, certain embodiments disclosed herein include a system for determining reachability properties of security objects. The system comprises: a processing circuitry; and a memory, the memory containing instructions that, when executed by the processing circuitry, configure the system to: access a security graph, wherein the security graph lists all security objects and their connections in a cloud environment of an organization; identify a plurality of network paths in the cloud environment, wherein each network path includes at least two security objects accessible in the cloud environment; for each of the plurality of identified network paths, iteratively analyze each security object in a respective network path to determine its reachability properties, wherein the reachability properties of a security object as a minimal set of reachable properties of all other security objects in the respective network path; and populate the security graph with the determined reachability properties of each security object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
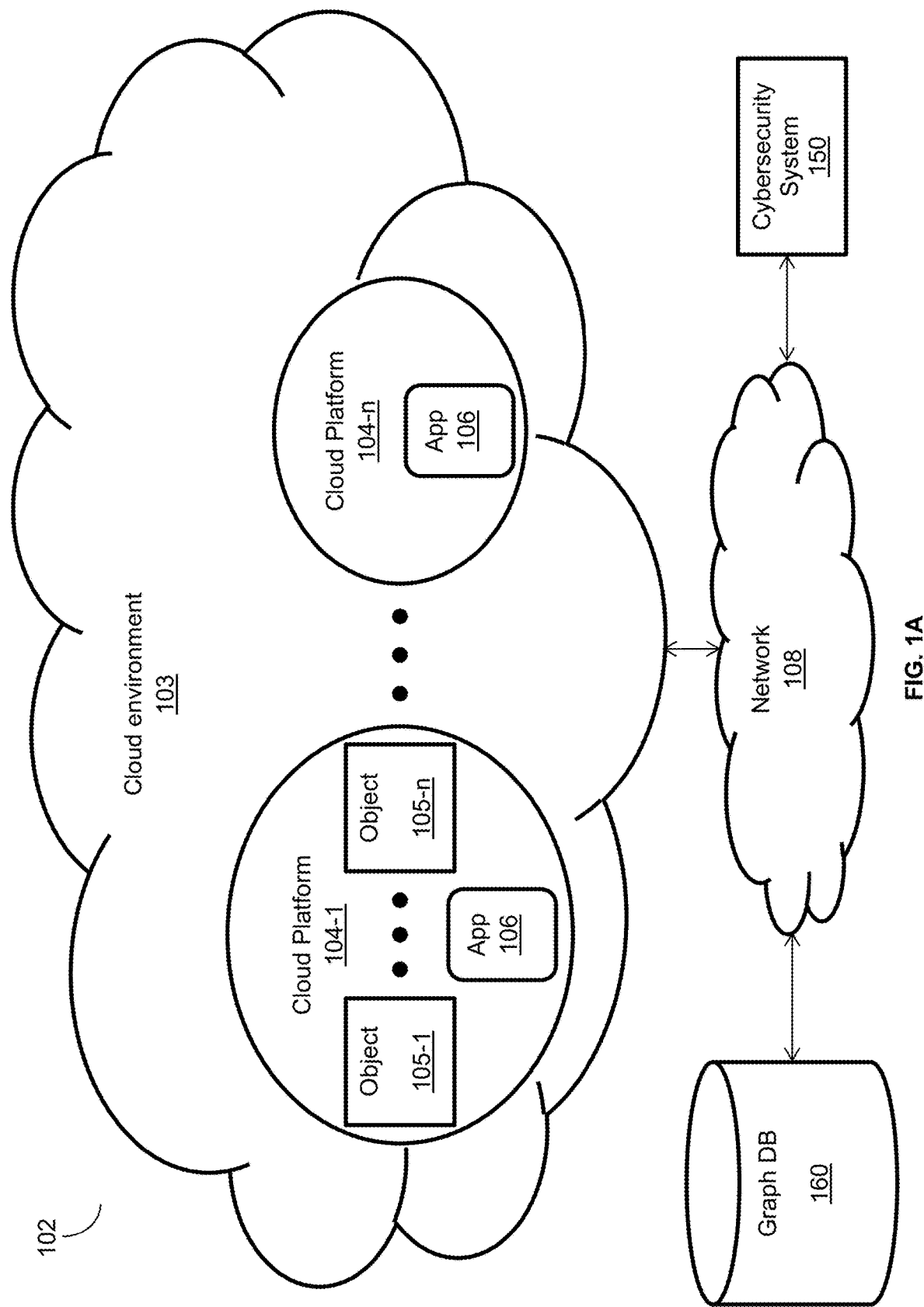
FIG. 1A is a diagram of a cloud environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The systems and methods described herein may be applicable to various systems, devices, networks, environments, layers, and the like, as well as cross-connections or multi-entity connections as may be established therebetween. The disclosed systems and methods may be applicable to provide support for various network features including, without limitation, application-layer communications, cloud-native constructs, cross-cloud and Kubernetes-to-cloud communications, third-party features, such as third-party containers and objects, container-management systems, such as Kubernetes, as may be virtualized as cloud objects, and the like, as well as any combination thereof.

FIG. 1A is an example diagram 100 of a cloud environment 103 utilized to describe the various embodiments. A cloud environment 103 represents an organization's cloud-based resources, and the various connections between such resources. The cloud environment 103 may include a number of cloud computing platforms, 104-1 through 104-n (hereinafter, "cloud platforms" 104 or "cloud platform" 104), where a cloud platform may include multiple security objects, 105-1 through 105-n (hereinafter, "security objects" 105 or "security object" 105), one or more applications (collectively referred to as applications or apps 106), and the like, as well as any combination thereof. Further, the cloud environment may be configured to connect, via a network 108, with a cyber-security system 150 and a graph database (graph DB) 160 for one or more purposes including, without limitation, those described hereinbelow. As is applicable to the cloud platforms 104 and security objects 105, "n" is an integer having a value greater than or equal to two. Further, it may be understood that, while a single configuration of a cloud environment 103 is shown for purposes of simplicity, a cloud environment 103 may include various combinations of platforms 104, objects 105, applications 106, and the like, as well as any combination thereof, without loss of generality or departure from the scope of the disclosure.

A cloud platform 104 is a platform, architecture, or other, like, configuration providing for connectivity of the various objects 106, applications 106, and other, like, elements included in a cloud platform 104, as well as the execution of various processes, instructions, and the like. A cloud platform 104 may be a commercially-available cloud system, provided on a service basis, such as, as examples and without limitation, Amazon AWS®, Microsoft Azure®, and the like. A cloud platform 104 may be a private cloud, a public cloud, a hybrid cloud, and the like. In addition, a cloud platform 104 may include, without limitation, container orchestration or management systems or platforms such as, as an example and without limitation, a Kubernetes® deployment, and the like, as well as any combination thereof.

A cloud platform 104 may be implemented as a physical network of discrete, interconnected objects, and the like, a virtual network, providing for interconnection of various virtual systems and devices, as well as a hybrid physical-virtual network, including both physical and virtualized components. A cloud platform 104 may be, or may replicate or otherwise simulate or emulate, as examples, and without limitation, a local area network, a wide area network, the Internet, the World-Wide Web (WWW), and the like, as well as any combination thereof. Further, a cloud platform 104 may include one or more subnets, such as the subnets, 130, of FIG. 1B, below, wherein each subnet may be configured to serve as a cloud platform 104 for the various security objects which may be included in the subnet, while retaining the connectivity and functionalities provided by the cloud platform 104.

Security objects 105, as may be included in a cloud platform 104, are objects, systems, devices, components, applications, entities, and the like, configured to operate within the cloud platform 104 and provide various functionalities therein. Specifically, the security objects 105 may be objects configured to send, receive, or both send and receive, network data. The security objects 105 may be configured to connect with various other security objects 105, various external objects, and the like, as well as any combination thereof, for purposes including, without limitation, sending data, receiving data, monitoring data transmissions, monitoring network status and activity, and the like, as well as any combination thereof. Security objects 105 may include one or more types of object, including, without limitation, network objects, computing objects, and the like, as well as any combination thereof. Network objects, as may be represented as security objects 105, are objects configured to provide one or more traffic-management functionalities. Examples of network objects include, without limitation, proxies, firewalls, routing tables, and the like. Further, computing objects, as may be represented as security objects 105, are objects configured to provide one or more data management or processing functionalities. Examples of computing objects include, without limitation, dedicated processing systems, fileservers, databases, and the like.

Examples of security objects 105, as may be relevant to the methods, processes, and descriptions provided herein include, without limitation, objects providing support for application-layer communications and systems, including application-layer communications and systems relevant to layer seven of the open systems interconnection (OSI) model. Further examples of security objects 105, relevant to the methods, processes, and descriptions provided herein, include, without limitation, cloud-native constructs, such as private endpoints, transit gateways, tag-based rulesets and objects configured to apply such rules, Kubernetes Istio and Calico services and applications, and the like. In addition, examples of security objects 105 may include, without limitation, third-party containers and images, such as Nginx, web-access firewall (WAF), and firewall implementations, multi-object or cross-object connections, such as cross-cloud connections and Kubernetes-to-cloud connections, as well as container managers, such as Kubernetes, and connections therewith. It may also be understood that security objects 105 may include other objects similar to those described hereinabove, as well as any combination thereof. As another example, security objects may include virtual entities, devices, and the like, to process layer-7 (application layer) traffic, such as objects relevant to Amazon AWS® layer seven services and applications, Amazon Load Balancer® (ALB) layer seven services and applications, Kubernetes ingress, and the like.

The security objects 105 may be configured to include one or more communication ports, where the included communication ports provide for connection of various objects according to one or more protocols, and at different communication layers of the OSI model.

In an example configuration, the security objects 105 are virtual entities or instances of systems, devices, or components, including virtual systems, devices, or components, or any combination thereof. Examples of security objects 105 include, without limitation, virtual networks, firewalls, network interface cards, proxies, gateways, containers, container management objects, virtual machines, subnets 130, hubs, virtual private networks (VPNs), and the like, as well as any combination thereof.

The applications 106, as may be executed in one or more cloud platforms 104, are services, processes, and the like, configured to provide one or more functionalities by execution of various commands and instructions. The applications 106 may be part of a software project of an enterprise or organization. The applications 160 may interact or communicate with other applications, regardless of the platform 104 in which the applications 106 are deployed. It should be understood that a single application, including the same application, may be both present and executed in multiple cloud platforms 104, including multiple cloud platforms 104 of the same cloud environment 103, without loss of generality or departure from the scope of the disclosure.

The network 108 is a communication system providing for the connection of the cloud environment 103, and its various components and sub-parts, with a cyber-security system 150, as well as other, like, systems, devices, and components, and any combination thereof. The network 108 may be implemented as a physical network of discrete systems, devices, components, objects, and the like, a virtual network, providing for interconnection of various virtual systems and devices, as well as a hybrid physical-virtual network, including both physical and virtualized components. The network 108 may be, as examples, and without limitation, a local area network, a wide area network, the Internet, the World-Wide Web (WWW), and the like, as well as any combination thereof.

The cyber-security system 150 is a system, device, or component, configured to provide one or more network analysis functionalities including, without limitation, network analysis, traffic analysis, object querying, graph generation, and the like, as well as any combination thereof. The cyber-security system 150 may be configured to execute one or more instructions, methods, processes, and the like, including, without limitation, the processes described with respect to FIGS. 2 and 3, other, like, processes, and any combination thereof.

The cyber-security system 150 may be configured as a physical system, device, or component, as a virtual system, device, or component, or in a hybrid physical-virtual configuration. A detailed description of a cyber-security system, 150, according to an embodiment, is provided with respect to FIG. 6, below. It may be understood that, while the cyber-security system 150 is depicted in FIG. 1A as a discrete element external to the cloud environment 103, the cyber-security system 150 may be included within any of the various elements of the network system 102, including the cloud environment 103, the various cloud platforms 104, and subparts thereof, and the network 108, without loss of generality or departure from the scope of the disclosure.

The graph database (graph DB) 160 is a storage or memory component, device, system, or the like, configured to provide one or more functionalities relevant to storage of graph-related data. The graph DB 160 may be configured to store graph-related data features of one or more types or formats, including, without limitation, raw data, graphs, graph edges, graph vertices, graph schemas, and the like, as well as any combination thereof, including those types or formats described hereinbelow.

Graphs, as may be included in the graph DB 160, are data features including one or more graph vertices, where such graph vertices may be variously interconnected by one or more graph edges. Graphs may be configured to provide for one or more representations of various data sets, including, without limitation, presentation of network data according to one or more graph schemas, as described hereinbelow. As an example, a graph relevant to the description of a collection of interconnected security objects may include one or more graph vertices, where each graph vertex corresponds with a security object, and graph edges between such vertices, the edges corresponding with connections between the various security objects. Graphs, and elements thereof, may be generated based on one or more data sets, including during the execution of a graph generation process, such as is described with respect to FIG. 2, below.

The graph DB 160 may be configured to store one or more graphs, graph, related data features, and the like, as well as any combination thereof. Graphs, as may be stored in the graph DB 160, may be configured to include one or more functional attributes, including, without limitation, directionality, labeling, and the like, where such functional attributes may provide for the execution or enhancement of one or more processes or methods which would be inapplicable to a graph not including such functional attributes. A graph including directionality may be configured to include connection between graph nodes or vertices, via graph edges, as described herein, where the edges connecting such vertices may be uni-directional or bi-directional, providing for enhanced analysis of security object structures and relationships. Further, a graph configured to include labeling functionality may be configured to provide for the labeling of graph vertices, graph edges, or both, with one or more labels describing the various properties of the labeled vertices or edges. As an example, a graph vertex representing a virtual machine (VM) may be configured to include a "name" label, describing a name property of the VM. Further, the VM may be configured to run a container entity, where the container entity, as represented in the graph, may be respectively labeled. In addition, according to the same example, the connection, or edge, between the vertices representing the VM and the container entity may be uni-directional and may be labeled as a "run" edge, providing for analysis of the relationship between the vertices, the direction of the relationship, and the type of the relationship.

The graph DB 160 may be configured as a physical system, device, or component, as a virtual system, device, or component, or in a hybrid physical-virtual configuration. It may be understood that, while the graph DB 160 is depicted in FIG. 1A as a discrete element external to the cloud environment 103, the graph DB 160 may be included within any of the various elements of the network system 102, including the cloud environment 103, the various cloud platforms 104, and subparts thereof, and the network 108, without loss of generality or departure from the scope of the disclosure. Further, it may be understood that the graph DB 160 may be directly connected to, or realized as a component of, the graph analysis system 150, without loss of generality or departure from the scope of the disclosure.

Figure 1B:
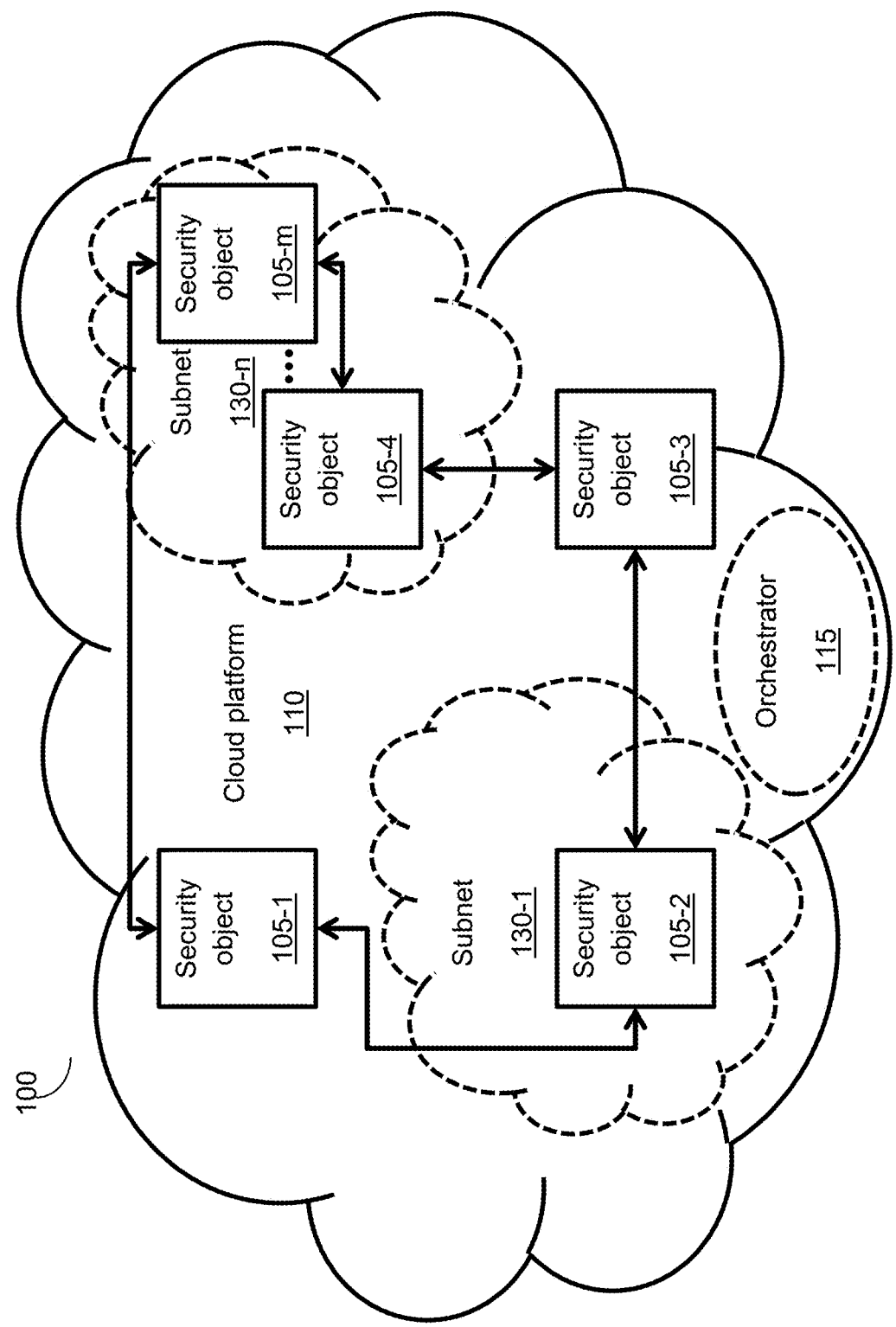
FIG. 1B is a network diagram depicting a network system and various associated network and external objects, according to an embodiment.

FIG. 1B is an example diagram depicting a network system 100 and various associated network and external objects, according to an embodiment. The depicted network system 100 includes a cloud platform 110, where the cloud platform 110 may be a cloud platform similar or identical to a cloud platform, 104, of FIG. 1A, above. The cloud platform 110 includes various subnets, 130-1 through 130-$n$ (hereinafter, "subnets" 130 or "subnet" 130), and various security objects, 105-1 through 105-$m$ (hereinafter, "security objects" 105 or "security object" 105). As is applicable to the subnets 130, "n" is an integer having a value greater than or equal to two. Further, as applicable to the security objects 105, "m" is an integer having a value greater than or equal to five. In addition, while the network system 100 of FIG. 1B includes certain elements and combinations of elements, as well as connections therebetween, it may be understood that the depiction is provided for illustrative purposes, and that other, like, elements, combinations of elements, and connections therebetween may be implemented without loss of generality or departure from the scope of the disclosure. Other, like, network systems 100 may further include multiple cloud platforms 110, including variously-interconnected cloud platforms 110, and other, like, variations and configurations, without loss of generality or departure from the scope of the disclosure.

As described with respect to FIG. 1A, above, the cloud platform 110 is a platform, architecture, or other, like, configuration providing for connectivity of the various systems, devices, and components described with respect to FIG. 1B. The cloud platform 110 may be a commercially-available cloud system, provided on a service basis, such as, as examples and without limitation, Amazon AWS®, Microsoft Azure®, and the like. The cloud platform 110 may be a private cloud, a public cloud, a hybrid cloud, and the like. The cloud platform 110 may be implemented as a physical network of discrete, interconnected objects, and the like, a virtual network, providing for interconnection of various virtual systems and devices, as well as a hybrid physical-virtual network, including both physical and virtualized components. The cloud platform 110 may be, or may replicate or otherwise simulate or emulate, as examples, and without limitation, a local area network, a wide area network, the Internet, the World-Wide Web (WWW), and the like, as well as any combination thereof. Further, as described with respect to FIG. 1A, above, the cloud platform 110 may include one or more subnets 130, wherein each subnet 130 may be configured to serve as a cloud platform 110 for the various security objects 105 included in the subnet 130, while retaining the connectivities and functionalities provided by the cloud platform 110.

The cloud platform 110 may be configured to include an orchestrator 115. The orchestrator 115 is configured to provide for management of the cloud platform 110. The orchestrator 115 may be configured to provide one or more functionalities including, without limitation, monitoring of elements or components of the cloud platform 110, logging and reporting data relating to the cloud platform 110, managing cloud platform 110 updates and maintenance, generating cloud platform 110 alerts, as well as other, like, functionalities, and any combination thereof. The orchestrator 115 may be configured to report one or more data features related to the cloud platform 110, such as may be requested during the execution of network analysis processes, such as those described hereinbelow.

The security objects 105 are security objects similar or identical to those security objects, 105, of FIG. 1A, above. As described with respect to FIG. 1A, the security objects 105 are virtual entities or instances of systems, devices, or components, including virtual systems, devices, or components, or any combination thereof. Further, as described with respect to FIG. 1A, security objects 105 may include, without limitation, security objects, network objects, and the like, as well as any combination thereof. Examples of security objects 105 include, without limitation, virtual networks, firewalls, network interface cards, proxies, gateways, containers, container management objects, virtual machines, subnets, 130, hubs, virtual private networks (VPNs), peering connections, load balancers, route tables, and the like, as well as any combination thereof.

External objects, as may be adjacent or relevant to a cloud platform 110, are objects similar or identical to the security objects 105. The external objects may be configured to communicate with one or more security objects 105, with other, various, external objects, and the like, as well as any combination thereof.

Figure 2:
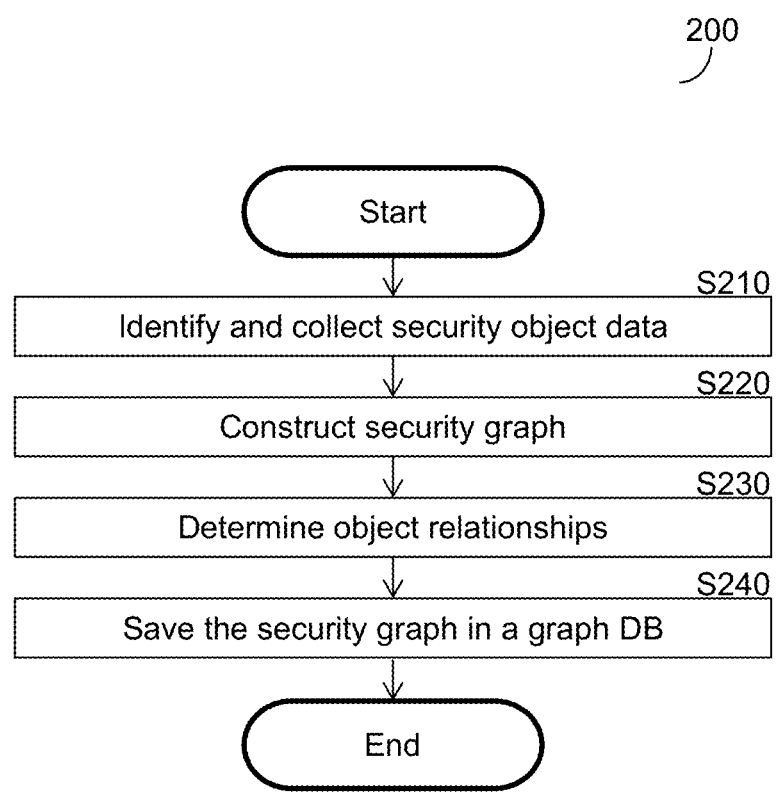
FIG. 2 is a flowchart depicting a method for constructing security graphs, including network and computing objects, for cloud environments, according to an embodiment.

FIG. 2 is an example flowchart 200 depicting a method for constructing security graphs, including network and computing objects, for cloud environments, according to an embodiment.

At S210, security objects are identified, and security object data is collected. In one embodiment, security objects may be identified by querying a cloud platform, through, for example, an orchestrator (e.g., orchestrator 115, of FIG. 1B, above), and the like. In an embodiment, S210 may include submitting one or more requests to each cloud platform and collecting responses therefrom. The requests may include instructions directing the orchestrator to report information including, without limitation, the number of devices connected to or included in the cloud platform, the names of such devices, the types of such devices, other, like, information, and any combination thereof.

In an embodiment, identification of security objects and collection of security object data at S210 includes querying each cloud platform, where such querying may include generation of one or more queries through an application programming interface (API), such as a REST API. Through the API, security objects' identities and description data are provided in response to such API queries. API queries may be pre-configured data requests, specified in the API, and configured to cause, for example, an orchestrator to return the one or more data features described herein. API queries may be generated based on one or more APIs, or the like, including generic APIs, such as REST, as well as platform-specific APIs, where such platform-specific APIs may be configured to provide for one or more predefined interactions with a cloud platform, such Amazon AWS®, Microsoft Azure®, and the like, where such predefined interactions may include, without limitation, security object identification and data collection.

Further, at S210, security object data is collected. Security object data is data describing one or more security objects, such as those objects, 105, of FIG. 1B, above. Security object data may include data describing, as examples and without limitation, object types, object names or unique identifiers (IDs), object network addresses, object port configurations, object status, such as online, offline, busy, and available, object input signal configurations, object output signal configurations, object security or access configurations, object processing rules and the like, as well as any combination thereof. Object data may be collected at S210 from one or more sources including, without limitation, various networks, network monitors, subnets, external objects, security objects, and the like, such as the cloud platform, 110, cyber-security system, 150, subnets, 130, external objects, security objects, 105, cloud platform orchestrators, 115, all of FIG. 1B, above, and the like, as well as any combination thereof. Collection of security object data, at S210, may be executed via one or more means including, without limitation, generation and transmission of one or more API queries, such as are described hereinabove, by other, like, means, and any combination thereof.

As a first example, collection of security object data at S210 may include collection of the identities of all objects included in a cloud platform by generation and transmission of an API query. In a second example, where a specific object, such as a given firewall, is specified in an API query, collection of security object data at S210 may include collection of object data from a firewall, including the collection of firewall rules, collection of firewall event logs, collection of firewall port configurations, and the like, as well as any combination thereof. As a third example, collection of security object data at S210 may include collection of object data from all virtual machines (VMs) in a cloud platform, where such VMs are described generally in an API query, including the collection of data resources or libraries internal to the VMs, VM port configurations, VM statuses, and the like, as well as any combination thereof.

At S220, a security graph is constructed. A security graph is a data feature describing the various objects included in, and adjacent to, a network, as well as the relationships between such objects. A security graph may be constructed based on data including, without limitation, data relevant to the objects identified at S210, from which data is collected, and the like, as well as any combination thereof. A security graph may be constructed in one or more various formats including, without limitation, a table, chart, or other, non-visual, data organization format, a list of objects, other, like, formats, and any combination thereof, where such formats may provide security object information including, without limitation, descriptions of security objects, properties, relations, and the like, as well as any combination thereof. In an embodiment, construction of a security graph, at S220, may include construction of a visual "node and link" graph. An example security graph schema, generated in a visual format and presented through a security graph utility, is described with respect to FIG. 3A, below. An additional security graph data feature, including a list of security objects, where the list is configured to describe an object-to-object path, is described with respect to FIG. 3B, below.

At S230, relationships between security objects are determined. Security object relationships are descriptions of the various connections between the security objects identified at S210. Network relationships may describe aspects of the connections between objects including, without limitation, connected objects, relevant ports of connected objects, connection bandwidths, connection durations, connection protocols, connection names or IDs, connection statuses, and the like, as well as any combination thereof.

In an embodiment, security object relationships may be determined at S230 using a static analysis process. In this embodiment, the static analysis may include analysis of object and protocol code and rules, based on simulated network operation, as collected at S210, to provide for identification of security object relationships based on security object configurations. As an example of a static analytic determination, data collected from a firewall at S210 may specify, in the firewall's port configurations, communication with a first device on a first port using a first protocol and connection with a second device on a second port using a second protocol. Further, according to the same example, the firewall object may include one or more instructions specifying transmission of a specific log file, via a third port, to a connected repository. According to the same example, security object relationships determined at S230 may include connections between the firewall and the first device, connections between the firewall and the second device, and connections between the firewall and the repository.

Determination of security object relationships at S230 may further include updating the graph or graphs constructed at S220 to include the determined relationships. Graphs may be updated at S230 by associating one or more data labels, tags, or other, like, features with a graph entry for a security object determined to have a relationship with another object. The association of data labels and tags may further include the association of labels or tags describing various aspects of the determined relationship or connection including, as examples and without limitation, connection source and destination, connection type, connection direction, connection status, connection protocol, and the like, as well as any combination thereof. Accordingly, as an example, determination, at S230, of a relationship between two objects may include the association of a data label or tag with each object included in the relationship, the data label or tag describing the same relationship for each object. Further, in an embodiment, where a graph is presented as a visual representation of a network system, such as a "node-and-link" graph, updating of the graph, at S230, based on determined relationships, may further include updating the visual graph to include visible "links" or connections between object "nodes," such as by, as examples and without limitation, updating the original visible graph to include such links, adding a second, visible overlay to the graph, including the links, and the like, as well as any combination thereof.

In addition, determination of security object relationships at S230 may include analysis of such determined relationships to identify impermissible relationships. Where determination at S230 includes such permissibility analysis, such analysis may include, without limitation, comparison of determined relationships with one or more dictionaries, or other, like, repositories of object relationship information, to determine whether a given relationship matches a predefined relationship included in the dictionary, where such a predefined relationship may be pre-tagged as "permissible," "not permissible," or the like. Where a determined relationship is determined to match a relationship which has been pre-defined as "not permissible" or as otherwise unacceptable, the relationship may be removed from the graph, such as by updating the graph in a manner similar to that described with respect to adding relationships to the graph, with the update providing for removal of one or more specified unacceptable relationships.

Further, in an embodiment, security object relationships may be determined at S230 by application of observational or active logging methods, such as those methods providing for detection of object-to-object connections by monitoring traffic of a network in use.

At S240, the generated security graph is saved in a graph database, such as the graph DB 160. The generated security graph includes any computing and/or network objects in the cloud environment of an organization. Such objects may be represented as nodes in the graph database, and their connections as edges. Each node, corresponding to each entity, stored in the database may include a recording describing its properties. Such properties may include "known network properties" (information that can be retrieved from querying the entity or the cloud platform) and calculated properties. One of the calculated properties includes a "reachable" or reachability property. The reachability property defines if and how an entity can be reached from an external or internal network. For example, an address, a port number, a protocol, and the like, or combination thereof, would describe how to reach the object. The various embodiments for reachable property are discussed in greater detail below.

It should be noted that, based on the known and calculated properties, security insights may be generated. Security insights are natural-language representations of aspects of the security graph constructed at S220. Security insights may include pure-text descriptions of objects and relationships. An example of a pure-text object relationship description may be "firewall one is connected to object two, which is a VM, and object three, which is a load balancer." Such representations may be in a query format.

In addition, security insights may include detailed descriptions of objects, relationships, and the like, as well as any combination thereof. An example of a detailed object relationship description may be "the gateway is currently active, and is connected to the VM via the second port, using the first protocol."

As another example, applicable to a multiple-step relationship, an insight may specify a path from "virtual machine one to load balancer five, where port eighty is routed to port 1337 on virtual machine one, then from load balancer five to firewall two, where port eighty of firewall two is open, then from firewall two to subnet sixteen, where subnet sixteen has a network address of 10.0.1.0/24, then from subnet sixteen virtual network ten, where virtual network ten has a network address of 10.0.0.0/16, then from virtual network ten to virtual network eleven, via peering connection twelve, where peering connection twelve includes a routing rule to virtual network twelve, specifying virtual network twelve's network address, where virtual network twelve's network address is 172.31.0.0/16." The insight described with respect to the second example may be interpreted to describe a virtual machine accessible from a virtual network via a series of hops, where only specific ports and addresses are allowed and routed through the firewall.

Further, generation of security insights at may include the generation of insights providing for, without limitation, description of network management or anomaly detection data, descriptions of network configurations or events which are rare or novel, such as connection of a new device to a network, descriptions of connections which are unauthorized, such as re-connection of a user's device to a subnet which the user is not permitted to access, descriptions of connections which display anomalous behavior, such as connections displaying spikes of network activity, and the like. Such insights may be generated according to one or more pre-defined or user-defined filters, rules, and the like, as well as any combination thereof. As an example, generation of security insights may include generation of an insight specifying that "VM thirty normally connects to load balancer twenty and firewall eight but is currently only connected to load balancer twenty."

In addition, insights may further include, without limitation, high-level insights, where high-level insights include information describing one or more features of a network which may not be detectable based on the analysis of individual objects. Examples of high-level insights may include, without limitation, "third-party networks A, B, and C currently have access to the internal network," "objects E, a database, and F, an administrator interface, are currently exposed to external networks," and "cross-environment exposure has been detected between the development and production environments."

The security objects in the graph database may be tagged based on properties and insights. Tagging of security objects at may include, without limitation, association of one or more data labels, tags, or other, like, features, with graph entries for one or more security objects, including entries in graphs such as those described with respect to S220, above. The data labels, tags, or other, like, features, with graph entries, may include descriptions of aspects of relevant graphs, objects, relationships, and the like, as well as any combination thereof. Examples of relevant descriptions include, as examples and without limitation, insights, such as those generated at S240, object relationships, such as those determined at S230, object details, such as may be collected at S210, descriptions of whether an object appears in another graph, object type counts, per-object connection counts, graph connection counts, descriptions of an object's open ports and counts thereof, descriptions of an object's network address or addresses, descriptions of protocols relevant to an object, and other, like, descriptions, as well as any combination thereof.

Figure 3A:
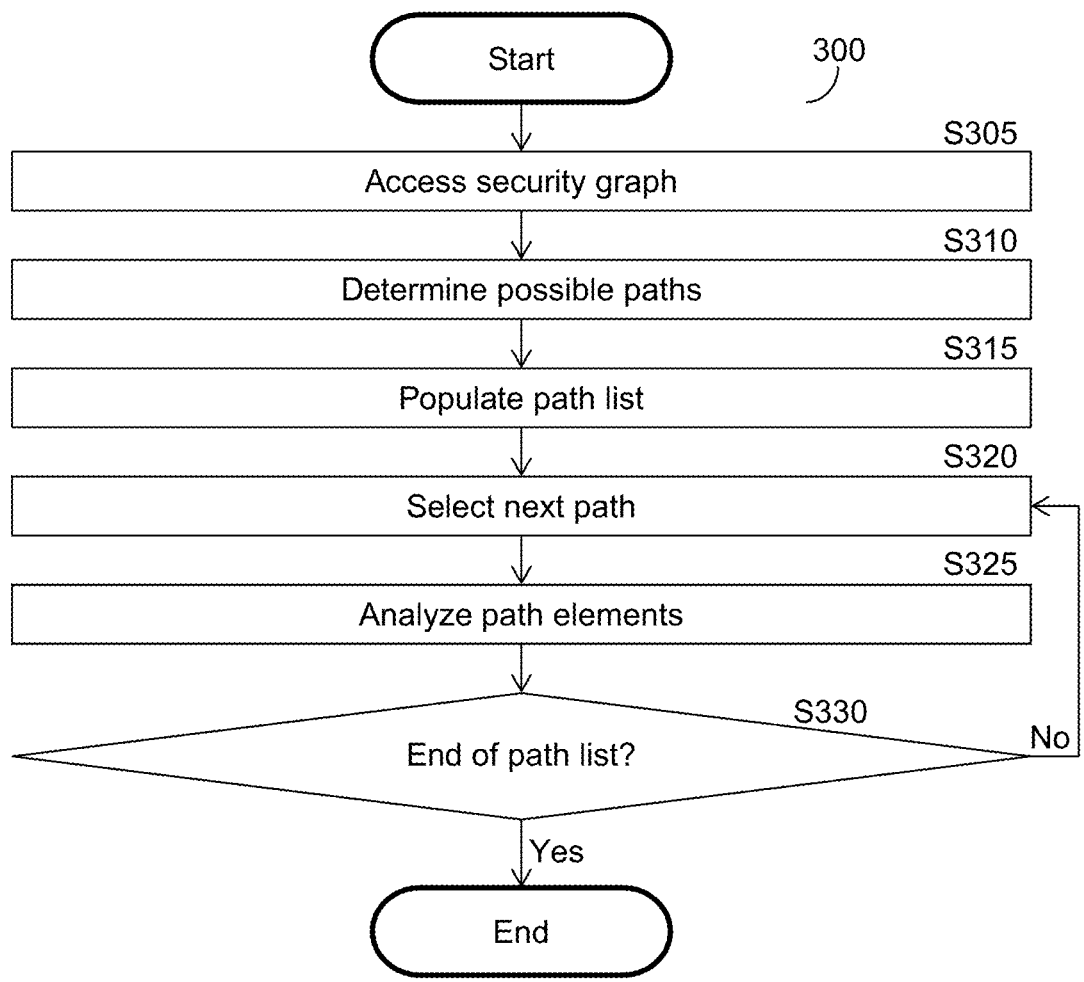
FIG. 3A is a flowchart depicting a method for determining reachable properties of network and computing objects according to an embodiment.

FIG. 3A is an example flowchart 300 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S305, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S310, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S3150 through S330, the list of paths are iteratively identified to determine the reachability properties of the path. Specifically, at S315, a path list is populated to include all identified paths. A path list may be a table, list, or other type of data structure. A path list may be unordered or ordered, including ordering according to one or more path properties. At S320, a path from the path list is selected. At a first run of the method a first path in the list is selected. At S325, path elements are analyzed to determine reachable properties. Path element analysis, as at S325, is an iterative analysis of each element included in the path selected at S320. The operation of S325 is discussed in detail with reference to FIG. 3B.

At S330, it is determined whether the last path of the path list has been analyzed, and if so, execution terminates; otherwise, execution returns to S320.

Figure 3B:
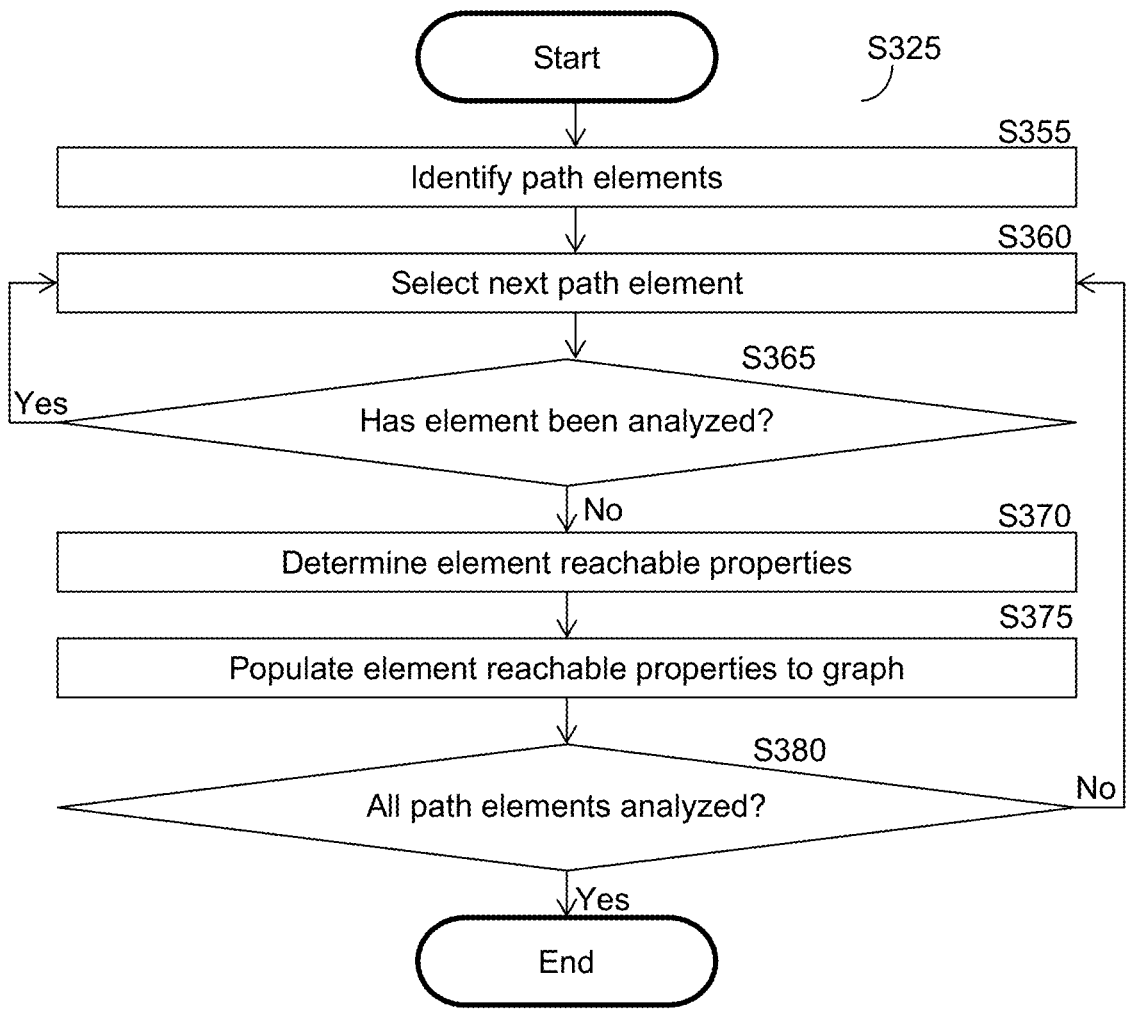
FIG. 3B is a flowchart depicting a process for analyzing a path to determine reachable properties according to an embodiment.

FIG. 3B is an example flowchart S325 depicting the analysis of a network path to determine reachable properties of objects included in the path, according to an embodiment.

At S355, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S310 of FIG. 3A, above, and the like, as well as any combination thereof. Further, identification of in-path elements may include identification of element properties or attributes including, without limitation, names, network addresses, rulesets, port configurations, and the like, as well as any combination thereof.

Then, at S360 through S380, the list of paths are iteratively processed in order to determine reachable properties of the elements. Specifically, at S360, the next element is selected. The next element is a subsequent element of the set of elements, within the selected path, identified at S355. Where execution of S360 follows the execution of S380, the next element may be an element which, in the selected network path, immediately follows the element relevant to the preceding execution of S370 and S375. Where execution of the method described with respect to FIG. 3B includes a first execution of S360, the first execution of S360 may include the selection of a first element of the selected path.

For exemplary purposes, a network path may be a path from a virtual machine (VM), connected to a NIC, connected to a load balancer, connected to a firewall. According to a first example, where S360 is executed for the first time, the first execution of S360 may include the selection of the VM as the selected element. Further, according to a second example, where execution of S360 follows execution of S380, selection of a next element at S360 may include selection of, following the VM, selection of the NIC, or, following the NIC, selection of the load balancer, or, following the load balancer, selection of the firewall.

At S365, it is determined whether the selected element has been analyzed. Determination of whether the selected element may include the determination of whether one or more reachable properties are included in the relevant graph element. As execution of S375 provides for the population of reachable properties into the security graph, an element which does not include such reachable properties in the graph may be assumed to have not been analyzed.

Where, at S365, it is determined that the selected element has been analyzed, execution continues with S360. Where, at S365, it is determined that the selected element has not been analyzed, execution continues with S370.

At S370, reachable properties are determined. Reachable properties are object properties describing if, and how, a given path element is reachable through the selected path, and, specifically, from an external/internal network. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

An example demonstrating the operation of S370 is discussed in detail with reference to FIG. 5.

At S375, reachable properties are populated into the security graph. Reachable properties, as may be determined at S370, may be populated into the graph by processes including, without limitation, labeling or tagging graph vertices, updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S380, it is determined whether all elements in the selected path have been analyzed. Determination of whether all elements in the selected path have been analyzed may include, without limitation, determination of whether the immediately preceding execution of S375 relates to the last element in the selected path, determination of whether additional elements remain in the path, determination of whether any additional in-path elements have been analyzed, and the like, as well as any combination thereof.

Where, at S380, it is determined that all elements in the selected path have not been analyzed, execution continues with S360. Where, at S380, it is determined that all elements in the selected path have been analyzed, execution terminates.

Figure 4A:
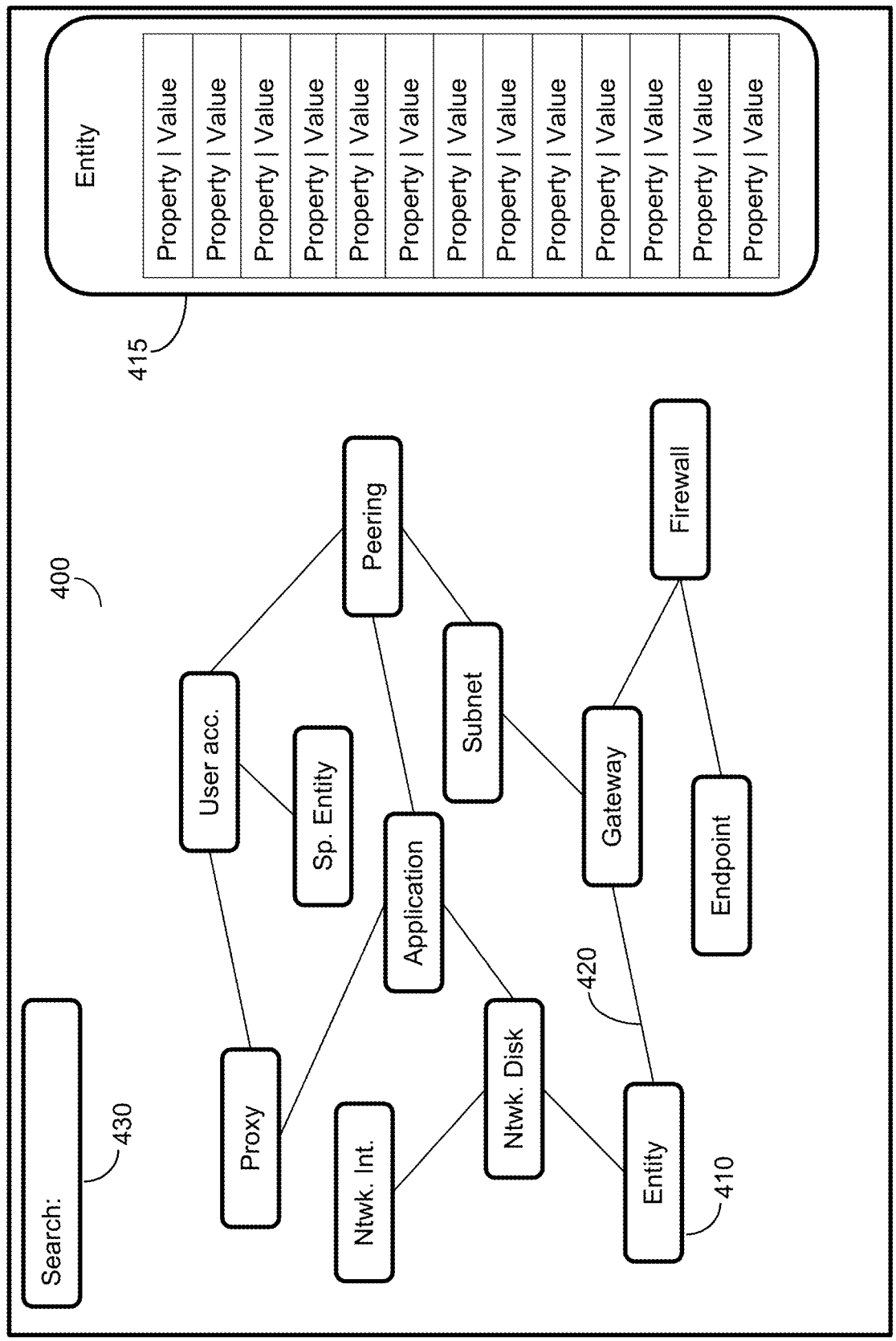
FIG. 4A is a security graph visualization, generated according to an embodiment.

FIG. 4A is an example screenshot of a security graph visualization 400, generated according to an embodiment. The example security graph visualization 400 is generated as a visual representation of a network and is presented through a security graph utility. A security graph utility may be an application, interface, or other, like, means of providing a visual representation of a security graph, and the like, where the provided security graph visualization 400 may include various interactive features, as described hereinbelow. A security graph utility may be configured as, as examples and without limitation, a web interface, an application or executable installed on a user or administrator device, other, like, configurations, and any combination thereof.

The security graph visualization 400 of FIG. 4A is a security graph visualization representing a network, such as the networks described hereinabove, wherein the various objects, systems, devices, components, and the like, of the network are represented as vertex visualizations 410, wherein such vertex visualizations are variously interconnected by edge visualizations 420, representing connections between the various objects, systems, devices, components, and the like. It may be understood that while only one vertex visualization 410 and one edge visualization 420 are labeled for purposes of simplicity, other, like, vertex visualizations 410 and edge visualizations 420 may be so labeled without loss of generality or departure from the scope of the disclosure.

The security graph visualization 400, and corresponding security graph utility, may be configured to provide for various interactive functionalities. In an embodiment, where a user interacts with a node vertex visualization 410, such as by clicking the vertex visualization 410 with a mouse or tapping the vertex visualization 410 through a touchscreen, the graph utility may be configured to display a vertex overview pane 415. The vertex overview pane 415 may be an information panel, including data relating to the given vertex visualization 410 and describing various object data features, such as those object data features identified or determined during the execution of a process similar or identical to that described with respect to FIG. 2. The vertex overview pane 415 may be configured to provide information relating to the various vertex visualizations 410 including, as examples and without limitation, object names, types, statuses, relevant metadata, and the like, as well as any combination thereof.

Further, the security graph visualization 400, and corresponding security graph utility, may be configured to include a search tool 430, providing for location and selection of one or more user-specified vertex visualizations 410 or edge visualizations 420 within the graph. The search tool 430 may be configured to provide for search functionality based on one or more user specifications including, as examples and without limitation, object names, types, IDs, statuses, labels or tags associated with various elements of the security graph visualization 400, and the like, as well as any combination thereof. In addition, the security graph visualization 400, and corresponding security graph utility, may be configured to include a help tool 440, providing for display of one or more resources related to the security graph visualization 400 and security graph utility.

It should be noted that a security graph visualization 400, shown in FIG. 4A, may be constructed in other formats including, without limitation, a table, chart, or other, non-visual, data organization formats, a list of objects, other, like, formats, and any combination thereof.

Figure 4B:
FIG. 4B is a security graph object list, configured to provide information describing object-to-object routing within a security graph, according to an embodiment.

FIG. 4B is an example security graph object list 450, configured to provide information describing object-to-object routing within a security graph, according to an embodiment. The security graph object list 450 includes a mode indicator 460, a mode-specific data display 465, and a list of objects, 470-1 through 470-*n* (hereinafter, "object" 470 or "objects" 470), where 'n' is an integer having a value greater than or equal to two. It may be understood that, while the provided security graph object list is configured to provide a list of objects 470 arranged according to a defined mode, other, like, modes and object 470 arrangements may be similarly applicable without loss of generality or departure from the scope of the disclosure.

The security graph object list 450 is a list of objects within a network, a segment of a network, a path of a network, and the like, as well as any combination thereof. A security graph object list 450 may be generated or provided as a function of one or more methods including, without limitation, those methods described herein, other, like, methods, and any combination thereof. A security graph object list 450 may be, without limitation, a feature of a security graph management tool or utility, such as a tool or utility configured to provide the security graph visualization of FIG. 4A, above, a stand-alone tool or utility, and the like, as well as any combination thereof. The security graph object list 450 may be configured to list security objects 470 in one or more orders based on factors including, without limitation, object names, object types, object connection latencies, mode-specific factors, other, like, factors, and any combination thereof. Where the security graph object list 450 is configured to list security objects 470 based on mode-specific factors, the mode indicator 460 may be configured to provide information describing a specific list mode, and the mode-specific data display 465 may be configured to provide information describing the contents of the list 450 in relation to one or more selected modes.

Modes are selected list-organization profiles, configured to provide for population of a security graph object list 450 in one or more configurations. Modes may provide for configuration of a security graph object list 450, including configurations specific to, as examples and without limitation, routing paths, object utilization or availability descriptions, other, like, configurations, and any combination thereof. Where a given mode is selected, the selected mode may be displayed via a mode indicator 460, where the mode indicator is configured to provide descriptive information regarding a selected mode. Further, where a mode is selected, the mode-specific data display 465 may be configured to display information regarding a specific security graph object list 350 populated based on the specified mode or modes.

As an example, with reference to the provided FIG. 4B, a "route" mode may be selected, providing for population of a security graph object list 450 with objects occupying a data path between a first object 470-1 and a destination object 470-*n*. According to the same example, the mode indicator 460 may be configured to display "Route," indicating that the security graph object list 450 is populated to provide information describing a route between the specified objects, and the mode-specific data display 465 may be configured to display "9 hops," indicating that a transmission from a first object 470-1 makes nine "hops," or transmissions between objects, before reaching the destination object 470-*n*. Further, according to the same example, the security graph object list 450 may be configured to include and display each security object 470 through which the transmission passes, including the first object 470-1 and the destination object 470-*n*, in the order of transmission.

Figure 5:
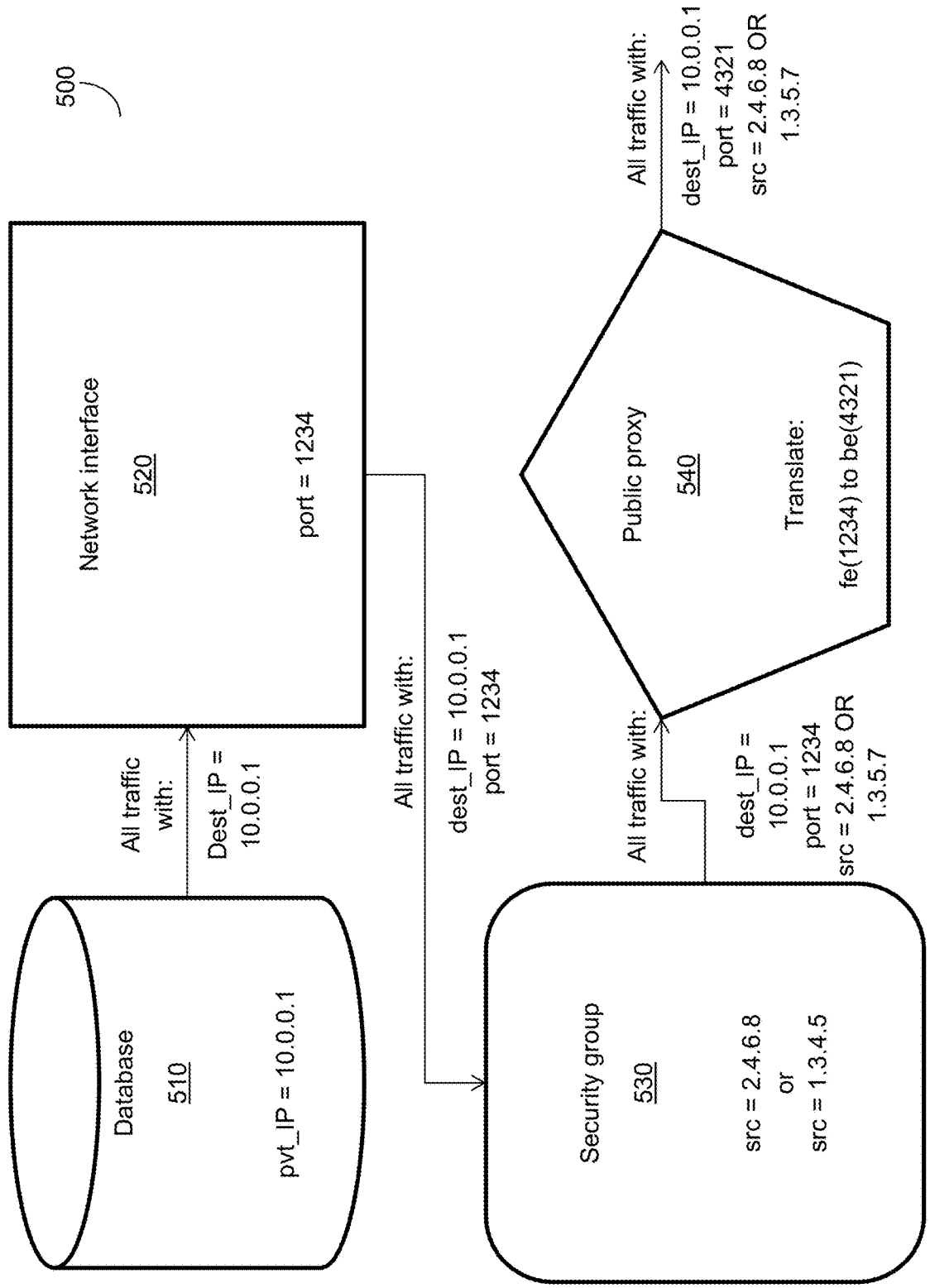
FIG. 5 is an illustration path, depicting the determination of reachable properties according to an embodiment.

FIG. 5 is an example path illustration 500 that includes a database 510, connected to a network interface (NIC) 520, connected to a public proxy 540, where a security group 530 is applied on the NIC 520.

The database 510, provided as the first element in the given path, includes a private IP address value, included in the element's properties, of 10.0.0.1, providing for accessibility of the database 510 only to traffic with a destination address of 10.0.0.1. The network interface 520 includes a port configuration specifying port 1234, included in the element's properties, providing for configuration of the network interface 520 to receive traffic through port 1234. The security group 530 includes a filtering rule, included in the element's properties, specifying source addresses 2.4.6.8 and 1.3.5.7, providing for transmission only of traffic originating from address 2.4.6.8 or address 1.3.5.7. The public proxy 540 includes a translation rule, included in the element's properties, which specifies translation of frontend port 1234 to backend port 4321.

To determine the reachable properties of the database 510, or the properties of another, like, element, the traffic permitted to pass through each object-to-object step of the path is determined based on the properties of each object. Where each object in the path includes properties describing permissible or impermissible transmissions or connections, such properties may be represented as network access control lists (NACLs). An NACL, according to the provided example, is a data feature describing one or more properties of allowed traffic. Further, in an embodiment, an NACL may be a data feature describing one or more properties of impermissible traffic. An NACL, according to the example, may be structured according to the examples shown below.

[port=from x11 to x12, IP=from y11 to y12, . . . ]
[port=from x21 to x22, IP=from y21 to y22, . . . ]

The provided example NACLs describe a set of transmission or connections which are permitted to pass through a network object having such NACLs. The provided example NACLs include a first NACL which provides for the allowance of connections or transmissions over ports x11 through x12 and with source IPs between y11 and y12, and a second NACL which provides for the allowance of connections or transmissions over ports x11 to x12 with source IPs between y11 and y22. Further, according to the same example, all traffic matching either of the provided NACLs may be considered allowed, while all other traffic may be considered blocked.

During the analysis of each path object, the aggregated allowed traffic, or all traffic which matches the NACLs of each preceding object, may be further restricted by comparing the aggregate allowed traffic with the NACLs of the analyzed path object. Such a restriction may be described as an intersection set operation, whereby the set of the aggregate allowed traffic, the set including all traffic not restricted by the NACLs of preceding path objects, may be compared with the set of all traffic permitted by the NACLs of the analyzed path object to identify a set of traffic which is both included in the aggregate allowed traffic and allowed by the analyzed path object's NACLs. The resulting common set of traffic may be, for analysis of subsequent path objects, considered as the set of allowed traffic, providing for the execution of similar analyses for all subsequent path objects.

As a further example, providing a high-detail description of a path analysis similar to that described above, a known network path may be from a database object 510, to a network interface object 520, to a security group object 530, to a public proxy object 540. According to the same example, the path analysis of the described path may be an analysis of "all possible traffic." Beginning with the database object 510, path analysis may include determination, based on properties of the database, that the database object 510 has a private IP address of 10.0.0.1. Next, proceeding to the network interface object 520, path analysis may include, based on the network interface object's 520 collected properties, determination that the only network interface object 520 port relevant to database object traffic is port number 1234, providing for the restriction of the initial "all possible traffic" to "all traffic with a destination IP address of 10.0.0.1, a port number of 1234, and any source." Subsequently, proceeding to the security group object 530, path analysis may include, based on the security group's 530 collected properties, determination that the security group object 530 only allows traffic from sources 2.4.6.8 and 1.3.5.7.

Following the determination of the security group object's 530 rules, the previously-restricted "all possible traffic" may be further restricted to "all traffic with a destination IP address of 10.0.0.1, a port number of 1234, and a source of 1.3.5.7," and "all traffic with a destination IP address of 10.0.0.1, a port number of 1234, and a source of 2.4.6.8." Further, proceeding to the public proxy object 540, path analysis may include determination that, based on the collected public proxy object 540 properties, the public proxy object 540 includes a rule which translates frontend port 4321 to backend port 1234. Accordingly, based on the identified public proxy object 540 rule, the already-restricted "all possible traffic" may be further restricted to "all traffic with a destination IP address of 10.0.0.1, a port number of 4321, and a source of 1.3.5.7," and "all traffic with a destination IP address of 10.0.0.1, a port number of 4321, and a source of 2.4.6.8." Subsequently, all allowable traffic which matches the specified restriction, as well as allowable traffic from other paths, may be associated with the graph element representing the database object 540, providing for determination of additional reachable properties for the database object 540, such as, as examples, "numAddressesOpenToNonStandardPorts=2," "numPortsOpenToInternet=1," and accessibleFromInternet=true."

In an embodiment, determination of reachable properties by path analysis may include execution of one or more traffic set operations similar to those described in the provided examples. Where determination includes such execution, relevant traffic set operations may include, without limitation, finding the intersection of two sets, finding the union of two sets, subtracting one set from another, finding the complement of a set, and the like, as well as any combination thereof. Further, in an embodiment, determination of reachable properties may include, for each step of a security graph path, one or more high-level operations including, without limitation, firewall operations, proxy and network address translation (NAT) operations, such as making address translations, gateway, virtual network, and subnet operations, such as checking routing rules to determine whether a routing rule relevant to an internet gateway is relevant to path traffic, checking routing rules, checking security rules, checking network paths and the like, as well as any combination thereof. The described high-level operations may, further, include the execution of one or more traffic set operations, such as those described hereinabove.

In an embodiment, reachable properties may, for various scopes, such as the internet, other virtual networks, other accounts, other environments, and the like, include, without limitation, whether a virtual machine (VM) or resource is accessible from a given scope, the number of addresses open to a given scope, the number of ports open to a given scope, possible paths, including paths formatted as lists of objects, traffic allowed in each path, and the like, as well as any combination thereof.

In addition, in an embodiment, determination of reachable properties may further include the creation of one or more edges on a graph, based on the results of the determinations. As an example, where a VM is determined to be accessible from a specific object, an edge may be added to the graph to represent the relationship between the VM and the specific object. Such creation of edges may provide for subsequent integration of the described relationships into a graph search.

Such determination of reachable properties, and values thereof, may provide for, in an embodiment, a separate "reachable properties" layer of a graph. Such a separate layer may be configured to provide for various functionalities including, without limitation, identification of one or more reachable properties for various security objects, generation of path-based or object-based insights, execution of queries over a graph, and the like, as well as any combination thereof.

Figure 6:
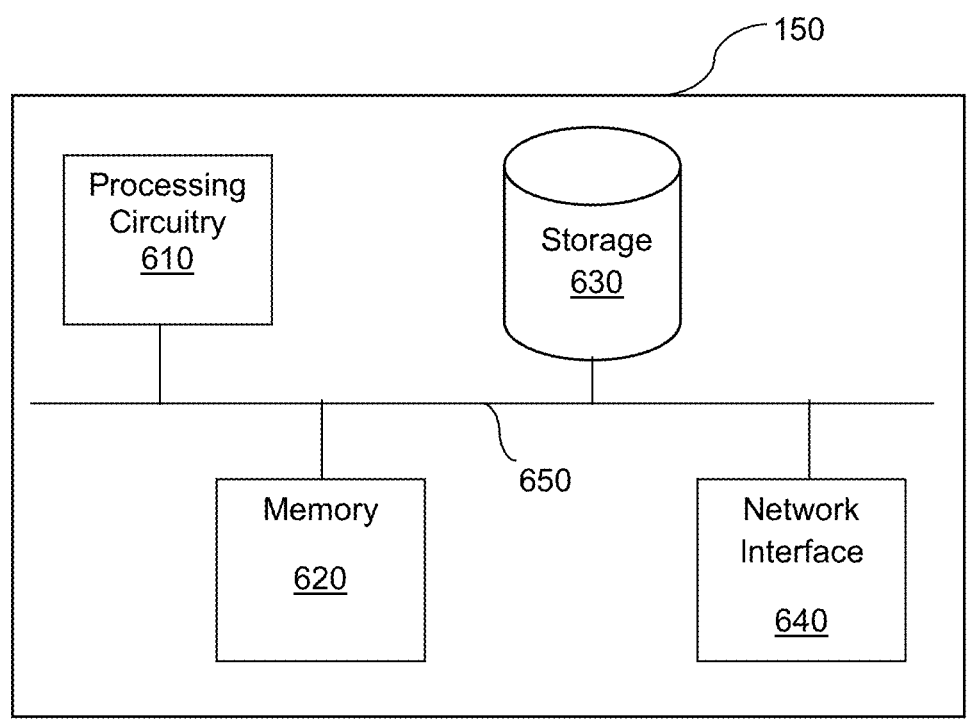
FIG. 6 is a hardware block diagram depicting a cybersecurity system, according to an embodiment.

FIG. 6 is an example hardware block diagram 600 depicting a cyber-security system 150, according to an embodiment. The cyber-security system 150 includes a processing circuitry 610 coupled to a memory 620, a storage 630, and a network interface 640. In an embodiment, the components of the cyber-security system 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 640 allows the cyber-security system 150 to communicate with the various components, devices, and systems described herein for generation of network analysis insights, as well as other, like, purposes.

It should be understood that the embodiments described herein are not limited to the specific architecture illustrated in FIG. 6, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method determining reachability properties of security objects, comprising:
   accessing a security graph, wherein the security graph lists all security objects and corresponding connections of the security objects in a cloud environment of an organization;
   identifying a plurality of network paths in the cloud environment, wherein each network path includes at least two security objects accessible in the cloud environment;
   for each of the plurality of identified network paths, iteratively analyzing each security object in a respective network path to determine its reachability properties, wherein the reachability properties of a security object as a minimal set of reachable properties of all other security objects in the respective network path, wherein the reachability properties of a security object define if and how the security object is reachable through the respective network path from at least a network external to the cloud environment; and
   populating the security graph with the determined reachability properties of each security object.

2. The method of claim 1, wherein identifying a plurality of network paths further comprises:
   traversing the at least a security graph.

3. The method of claim 1, wherein the security graph is saved in a graph database, and wherein identifying a plurality of network paths further comprises:
   querying the graph database to retrieve the network paths.

4. The method of claim 1, wherein analyzing a security object in a respective network path further comprises:
   determining network properties defined for each security objects in the security graph; and
   restricting the network properties of the security object based on the aggerated allowed traffic matching reachability properties of each preceding security object in the network path, wherein the restricted network properties of the security object are the reachability properties of the security objects.

5. The method of claim 4, further comprising:
representing reachability properties of a security object as a network access control list (NACL).

6. The method of claim 5, further comprising:
performing at least one operation on two NACLs of two security objects to determine reachability properties, wherein the at least one operation is any one of: union, subtraction, complement, and intersection.

7. The method of claim 1, wherein the reachability properties include any one of: a source IP address, a destination IP address, a port number, and a security group.

8. The method of claim 1, wherein populating the security graph with the determined reachability properties of each security object further comprises:
associating each security object in the graph with the security object's determined reachability properties and respective security graph.

9. The method of claim 1, wherein the analysis of each security object in a respective network path is a static analysis, thereby the static analysis does not require simulating of network traffic.

10. A non-transitory computer readable medium having stored thereon instructions for causing a processing circuitry to execute a process for determining reachability properties of security objects, the process comprising:
accessing a security graph, wherein the security graph lists all security objects and corresponding connections of the security objects in a cloud environment of an organization;
identifying a plurality of network paths in the cloud environment, wherein each network path includes at least two security objects accessible in the cloud environment;
for each of the plurality of identified network paths, iteratively analyzing each security object in a respective network path to determine its reachability properties, wherein the reachability properties of a security object as a minimal set of reachable properties of all other security objects in the respective network path, wherein the reachability properties of a security object define if and how the security object is reachable through the respective network path from at least a network external to the cloud environment; and
populating the security graph with the determined reachability properties of each security object.

11. A system for for determining reachability properties of security objects, comprising:
a processing circuitry; and
a memory, the memory containing instructions that, when executed by the processing circuitry, configure the system to:
access a security graph, wherein the security graph lists all security objects and corresponding connections of the security objects in a cloud environment of an organization;
identify a plurality of network paths in the cloud environment, wherein each network path includes at least two security objects accessible in the cloud environment;
for each of the plurality of identified network paths, iteratively analyzing each security object in a respective network path to determine its reachability properties, wherein the reachability properties of a security object as a minimal set of reachability properties of all other security objects in the respective network path, wherein the reachability properties of a security object define if and how the security object is reachable through the respective network path from at least a network external to the cloud environment; and
populate the security graph with the determined reachability properties of each security object.

12. The system of claim 11, wherein the system is further configured to:
traverse the at least a security graph.

13. The system of claim 11, wherein the security graph is saved in a graph database, and wherein the system is further configured to:
query the graph database to retrieve the network paths.

14. The system of claim 11, wherein the system is further configured to:
determine network properties defined for each security objects in the security graph; and
restrict the network properties of the security object based on the aggerated allowed traffic matching reachability properties of each preceding security object in the network path, wherein the restricted network properties of the security object are the reachability properties of the security objects.

15. The system of claim 14, wherein the system is further configured to:
represent reachability properties of a security object as a network access control list (NACL).

16. The system of claim 14, wherein the system is further configured to:
perform at least one operation on two NACLs of two security objects to determine reachability properties, wherein the at least one operation is any one of: union, subtraction, complement, and intersection.

17. The system of claim 11, wherein the reachable properties include any one of: a source IP address, a destination IP address, a port number, and a security group.

18. The system of claim 11, wherein the system is further configured to:
associate each security object in the graph with the security object's determined reachability properties and respective security graph.

19. The system of claim 11, wherein the analysis of each security object in a respective network path is a static analysis, thereby the static analysis does not require simulating of network traffic.

* * * * *

UNITED STATES PATENT AND TRADEMARK OFFICE
CERTIFICATE OF CORRECTION

PATENT NO. : 11,374,982 B1
APPLICATION NO. : 17/179135
DATED : June 28, 2022
INVENTOR(S) : Shai Keren et al.

It is certified that error appears in the above-identified patent and that said Letters Patent is hereby corrected as shown below:

On the Title Page

Item (57), ABSTRACT should read as follows:
A method and system for determining reachability properties of security objects are provided. The method includes accessing a security graph, wherein the security graph lists all security objects and their connections in a cloud environment of an organization; identifying a plurality of network paths in the cloud environment, wherein each network path includes at least two security objects accessible in the cloud environment; for each of the plurality of identified network paths, iteratively analyzing each security object in a respective network path to determine its reachability properties, wherein the reachability properties of a security object is a minimal set of reachable properties of all other security objects in the respective network path; and populating the security graph with the determined reachability properties of each security object.

In the Specification

In the summary, Column 3, Line 17, should read as follows:
"wherein the reachability properties of a security object is a minimal set of reachable properties of all other security objects in the respective network path"

In the summary, Column 3, Line 34, should read as follows:
"wherein the reachability properties of a security object is a minimal set of reachable properties of all other security objects in the respective network path"

In the Claims

Column 22, Line 31, Claim 1, should read as follows:
1. A method determining reachability properties of security objects, comprising:
    accessing a security graph, wherein the security graph lists all security objects and corresponding connections of the security objects in a cloud environment of an organization;

Signed and Sealed this
Twenty-sixth Day of September, 2023

Katherine Kelly Vidal
*Director of the United States Patent and Trademark Office* identifying a plurality of network paths in the cloud environment, wherein each network path includes at least two security objects accessible in the cloud environment;

for each of the plurality of identified network paths, iteratively analyzing each security object in a respective network path to determine its reachability properties, wherein the reachability properties of a security object is a minimal set of reachable properties of all other security objects in the respective network path, wherein the reachability properties of a security object define if and how the security object is reachable through the respective network path from at least a network external to the cloud environment; and populating the security graph with the determined reachability properties of each security object.

Column 22, Line 53, Claim 2, should read as follows:
2. The method of claim 1, wherein identifying a plurality of network paths further comprises: traversing the at least security graph.

Column 23, Line 24, Claim 10, should read as follows:
10. A non-transitory computer readable medium having stored thereon instructions for causing a processing circuitry to execute a process for determining reachability properties of security objects, the process comprising:

accessing a security graph, wherein the security graph lists all security objects and corresponding connections of the security objects in a cloud environment of an organization;

identifying a plurality of network paths in the cloud environment, wherein each network path includes at least two security objects accessible in the cloud environment;

for each of the plurality of identified network paths, iteratively analyzing each security object in a respective network path to determine its reachability properties, wherein the reachability properties of a security object is a minimal set of reachable properties of all other security objects in the respective network path, wherein the reachability properties of a security object define if and how the security object is reachable through the respective network path from at least a network external to the cloud environment; and populating the security graph with the determined reachability properties of each security object.

Column 23, Line 47, Claim 11, should read as follows:
11. A system for determining reachability properties of security objects, comprising:

a processing circuitry; and a memory, the memory containing instructions that, when executed by the processing circuitry, configure the system to:

access a security graph, wherein the security graph lists all security objects and corresponding connections of the security objects in a cloud environment of an organization;

identify a plurality of network paths in the cloud environment, wherein each network path includes at least two security objects accessible in the cloud environment;

for each of the plurality of identified network paths, iteratively analyzing each security object in a respective network path to determine its reachability properties, wherein the reachability properties of a security object is a minimal set of reachability properties of all other security objects in the respective network path, wherein the reachability properties of a security object define if and how the security object is reachable through the respective network path from at least a network external to the cloud environment; and populate the security graph with the determined reachability properties of each security object.

Column 24, Line 17, Claim 12, should read as follows:
12. The system of claim 11, wherein the system is further configured to:
traverse the at least security graph.